United States Patent [19]

Hogan

[11] Patent Number: 4,872,954
[45] Date of Patent: Oct. 10, 1989

[54] APPARATUS FOR THE TREATMENT OF WASTE

[76] Inventor: Jim S. Hogan, 1742 Country Club Dr., Sugar Land, Tex. 77478

[21] Appl. No.: 124,976

[22] Filed: Nov. 24, 1987

[51] Int. Cl.$^4$ .................................................. B01J 8/10
[52] U.S. Cl. ...................................... 202/105; 48/111; 202/117; 202/118; 202/131; 202/151
[58] Field of Search ............... 202/131, 101, 105, 117, 202/118; 48/111

[56] References Cited

U.S. PATENT DOCUMENTS

| | | | |
|---|---|---|---|
| 514,546 | 2/1894 | Ekelund | 202/151 |
| 1,446,857 | 2/1923 | Peiter | 202/131 |
| 1,857,171 | 5/1932 | Vandegrift | 202/131 |
| 1,898,326 | 2/1933 | Wahlstrom | 48/111 |
| 1,916,900 | 7/1933 | Vandegrift et al. | 202/131 |
| 1,927,244 | 9/1933 | Pier et al. | 233/15 |
| 1,980,828 | 11/1934 | Reed et al. | 202/131 |
| 1,995,873 | 3/1935 | Vandegrift et al. | 202/131 |
| 2,151,849 | 3/1939 | Hardy et al. | 202/131 |
| 2,219,407 | 10/1940 | Baptist | 202/131 |
| 2,500,553 | 3/1950 | Lykken | 202/131 |
| 3,020,212 | 2/1962 | Lanz | 202/118 |
| 3,398,058 | 8/1968 | Campbell | 48/111 |
| 3,639,111 | 2/1972 | Brink et al. | 48/111 |
| 3,691,019 | 9/1972 | Brimhall | 202/118 |
| 3,771,263 | 11/1973 | Borggreen et al. | 48/111 |
| 3,787,292 | 1/1974 | Keappler | 202/118 |
| 3,794,565 | 2/1974 | Bielski et al. | 202/131 |
| 4,037,543 | 7/1977 | Angelo | 202/131 |
| 4,058,205 | 11/1977 | Reed | 202/131 |
| 4,061,544 | 12/1977 | Ackeren et al. | 202/151 |
| 4,122,036 | 10/1978 | Lewis | 202/131 |
| 4,235,676 | 11/1980 | Chambers | 48/111 |
| 4,308,103 | 12/1981 | Ritter | 48/111 |
| 4,374,704 | 2/1983 | Young | 202/131 |
| 4,439,209 | 3/1984 | Wilwerding et al. | 48/76 |

FOREIGN PATENT DOCUMENTS 2744896  4/1979  Fed. Rep. of Germany ........ 48/111

Primary Examiner—Peter Kratz
Attorney, Agent, or Firm—A. Triantaphyllis

[57] ABSTRACT

An apparatus and method are disclosed for the separation and extraction of a waste material into a solid, a liquid, and a gas phase utilizing a rotating drum that is heated by a fluid medium circulating over the exterior surface of the drum in a chamber. The interior of the drum is sealed from the atmosphere and from the chamber. The waste material flows to the interior of the drum where the liquid components are vaporized and the solids are dried. The drum vapor effluent is cooled and the condensable components are condensed and separated. The noncondensable components are used as fuel for heating the heating medium. The dry solids flow from the retort to disposal facilities.

42 Claims, 4 Drawing Sheets

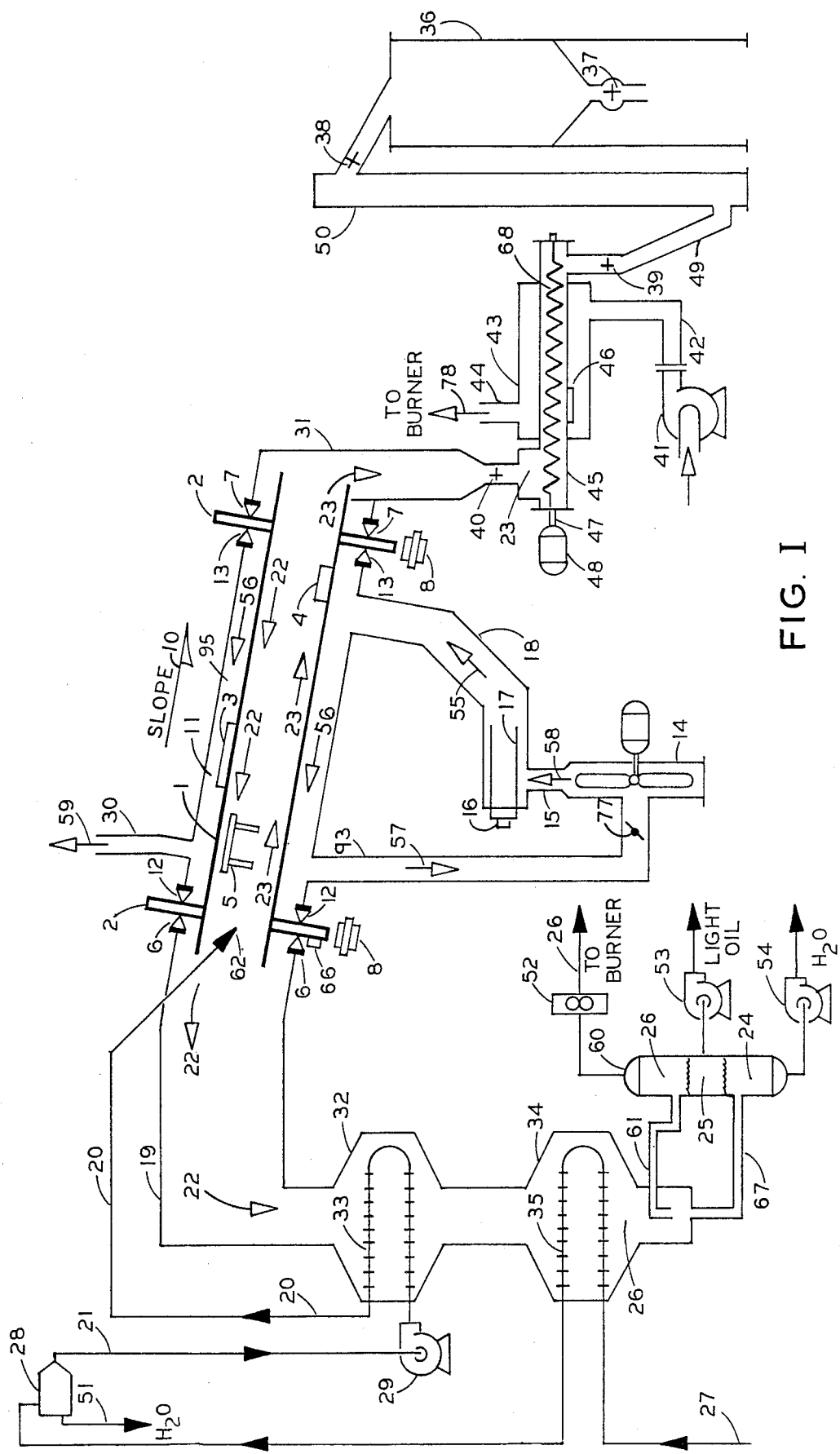
FIG. I

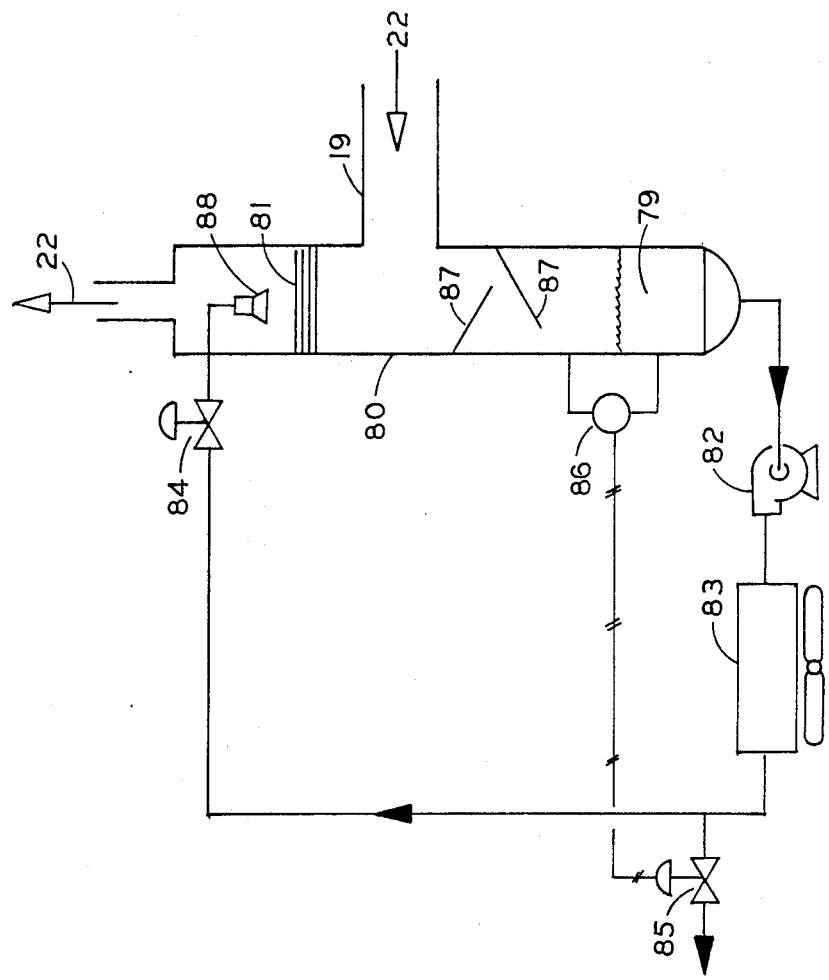
FIG. III
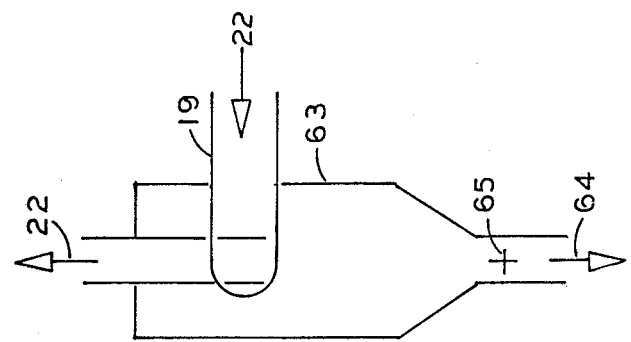
FIG. II

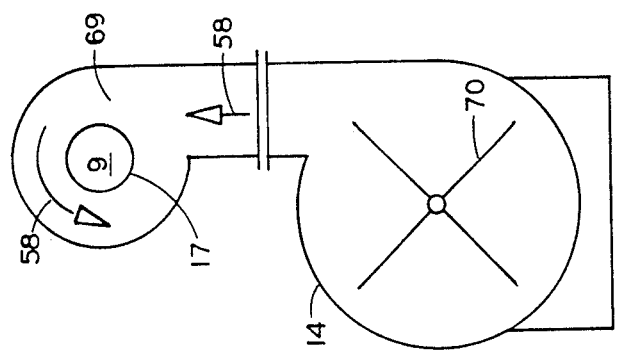
FIG. VII
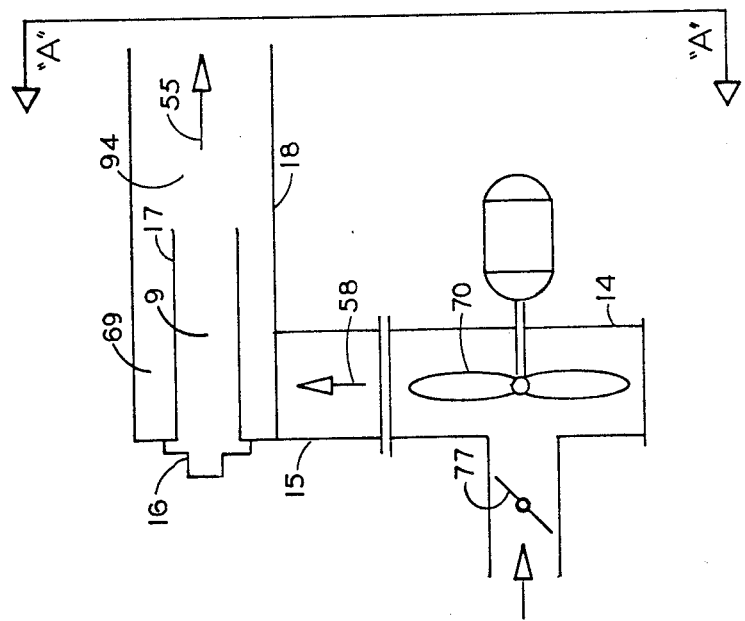
FIG. VI
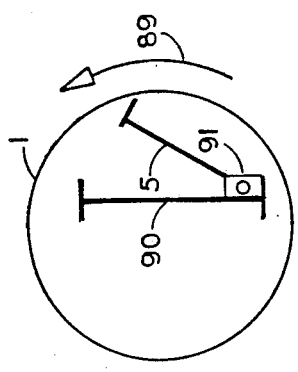
FIG. IV
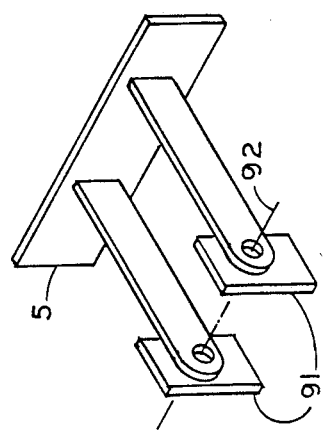
FIG. V

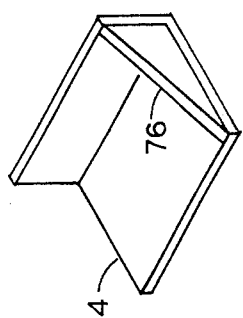
FIG. XI
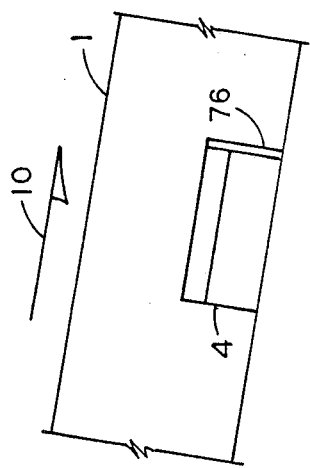
FIG. IX
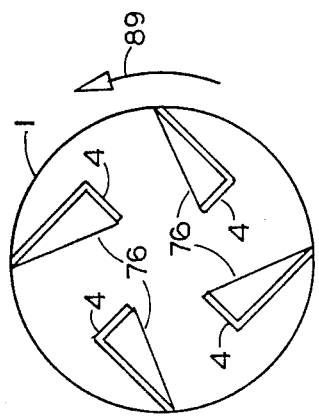
FIG. X
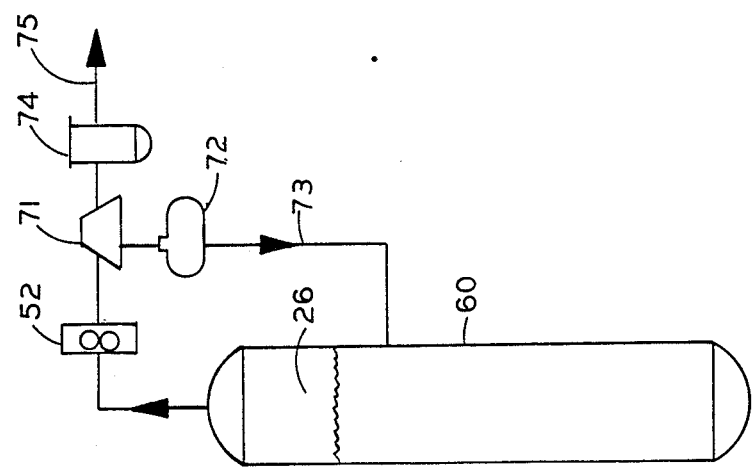
FIG. VIII

APPARATUS FOR THE TREATMENT OF WASTE

FIELD OF THE INVENTION

This invention relates to the field of waste disposal and, more particularly, to a method and an apparatus for the separation of a waste material into its solid, liquid, and gas phases for easier use or disposal. Still more particularly, the invention relates to a method and an apparatus wherein the waste is thermally treated in a drum and the heat is provided by a heating medium circulating over the exterior surface of the drum.

BACKGROUND OF THE INVENTION

Disposing of waste material by incineration in a rotating kiln, or retort, is well known in the art. In most incinerators, however, the flame is applied directly to the waste material whereby, the flame combustion gases and the gases from the waste material intermingle. Because of the hazardous nature, that mixture cannot be released into the atmosphere unless the hazardous components are removed in exhaust stack gas cleaning and scrubbing apparatus and special permits are obtained. The installation of those cleaning and scrubbing apparatus and the issuance of those permits are time consuming and very uneconomical.

In other applications, rotating kilns are placed in an oven that is sealed from the inside chamber of the kiln and the drum is exposed directly to the flame. These configurations have several disadvantages. One disadvantage is that the direct flame weakens the drum. Another disadvantage is that the drum may develop hot spots thereby, causing the waste material to stick to the interior drum walls. Another disadvantage is that such heat ovens normally have a high exhaust gas temperature and are, therefore, very inefficient.

U.S. Pat. No. 3,020,212, teaches how to reclaim usable materials from refuse by having a flame outside of the retort chamber. That patent, however, does not disclose recirculating the hot exhaust gases, using a rotating drum, recovering the condensable vapors or exchanging heat between the effluent vapors and the feed.

U.S. Pat. No. 3,787,292, discloses retorting a waste material in a chamber separated from the combustion gases. That patent, however, does not disclose the recirculation of hot exhaust gases, but the exposure of the drum walls to direct flame. U.S. Pat. No. 4,439,209, also teaches how to retort a waste material in a separate rotating drum inside an oven without recirculating the exhaust gases.

It is, therefore, an object of the present invention to provide an apparatus for efficiently retorting a waste material into its separate phases of liquid, solids, and gases, without commingling the separate phases of the waste material with the atmosphere or with the heater combustion gases.

It is also an object of the present invention to provide an apparatus for efficiently retorting a waste material by providing a first inside chamber for the waste material, a second outside chamber for providing a flow of hot gases to impart heat to the inside chamber, an additional chamber for containing a burner zone, and means for pumping hot gases from one end of the second chamber around the burner zone for cooling the fire tube and blending with the products of combustion and back to the other end of the second chamber.

It is also an object of the present invention to teach how to prevent the waste materials from sticking to the inside wall of the rotating drum by providing a special scraper.

It is also an object of the present invention to teach how to control the flow of solids through the rotating drum by providing internal baffles with retaining walls.

It is also an object of the present invention to provide a more efficient retort by recirculating the hot exhaust gases back through the burner zone.

It is also an object of the present invention to provide a more efficient retort by cross exchanging heat from the hot solid waste material to the combustion air.

It is also an object of the present invention to provide a more efficient retort by cross exchanging heat from the vapors from the waste materials to the feed.

It is also an object of the present invention to provide an apparatus for retorting a material and means for separating the heavier liquids from the lighter liquids from said retorted material.

It is also an object of the present invention to provide an apparatus for retorting a material and means for separating the heavier oils from the lighter oils from said retorted materials.

Other objects and advantages of the invention will become more apparent upon a consideration of the preferred embodiments described hereinafter.

SUMMARY OF THE INVENTION

Accordingly, an apparatus and a method are disclosed for treating and disposing waste material by separating the waste material to a gas, a liquid and a solid phase. The waste material flows to the interior of a retorting drum where it is heated by a heating medium circulating on the exterior surface of the drum. The heat vaporizes the liquid components of the material to produce a vapor effluent and a solid effluent. The vapor effluent is partially condensed to produce disposable liquid components such as water and oil. The uncondensed components are disposed by burning or other appropriate means. The solid effluent is cooled and taken to disposal facilities by appropriate solid handling equipment.

The apparatus of the present invention includes a sloped rotating drum, an enclosure enclosing the drum and forming a chamber therebetween, a burner, an inflow line for flowing hot gases from the burner into the chamber, an outflow line for flowing cold gases from the chamber back to the burner by a fan, a damper for regulating the flow of gases through the outflow line, and an exhaust line for exhausting excess gases from the chamber into the atmosphere. The front end of the drum includes means for receiving waste material and an opening for allowing the flow of gases generated by the waste in the drum through a conduit, first, to a first vapor effluent condenser/feed preheater and, then, to a second vapor effluent condenser/feed preheater. The second vapor effluent condenser/feed preheater is connected to an accumulator where the condensed material flows and separates by phase separation. The separated liquids are pumped from the accumulator for appropriate disposal. An overhead line connects the overhead of the accumulator and the burner and a compressor is provided therein to provide sufficient pressure for the flow of vapors from the accumulator to the burner.

The second or lower end of the drum is connected to a screw conveyor by a solids collection chamber allowing the flow of solids from the lower end of the drum to the screw conveyor by gravity. The outlet of the conveyor is connected to a bucket elevator and the outlet of the bucket elevator is connected to a solids storage tank. The screw conveyor is partially surrounded by a conduit wherein air supplied by an air blower flows, on its way to the burner.

The interior of the rotating drum is sealed from the atmosphere, except for the exhaust line. Furthermore, the interior of the rotating drum is not in fluid communication with the chamber that surrounds it. The drum includes scrapers for scrapping material from the interior surface thereof and baffles for impeding the rapid flow of solids in and out of the drum.

In operation, raw waste feed is preheated in the second vapor effluent condenser/feed preheater and is flowed into a centrifuge where a large portion of the water contained therein is removed. The concentrated feed is then pumped through the second vapor effluent condenser/feed preheater and is then conveyed to the inlet of the drum. In the drum, the waste is subjected to the heat supplied by circulating gases on the exterior of the drum. The liquid components thereof are vaporized and the solid components thereof are dried and sterilized. The vapor components flow out of the drum through the front end, first, to the first vapor effluent condenser/feed preheater and, then, to the second vapor effluent condenser/feed preheater. The condensable components of the vapor effluent condense, and accumulate and separate in the accumulator as previously described. The noncondensable components flow from the top portion of the accumulator to the burner where they are burned.

The dry solid effluent from the drum flows to the screw conveyor where it is cooled by the air flowing around the conveyor. The conveyor transports the solids to a solids collector and a bucket elevator which, in turn, transports them to a solids storage tank.

Certain modifications can be made to the apparatus. In one modification, the rotating drum may be replaced by a screw conveyor and appropriate auxiliary feeding and discharge equipment. In another modification, an air cooler may be used to cool the vapor effluent from the drum, and/or a water supply line may be provided to increase the cold water content of the waste material to provide cooling in the second vapor effluent condenser/feed preheater. In another modification, a screw conveyor may be used instead of a pump to convey the waste material to the drum. In another embodiment, a chiller may be used in the overhead line of the accumulator to condense hazardous components from the gas stream flowing to the burner. The chiller may be followed by a charcoal filter or other suitable means to remove residual hazardous components from the noncondensable gases before they flow to the burner. In another modification, a cyclone may be used to remove ashes or other solids from the vapor effluent of the drum. Still in another modification, a scrubber may be used to remove such material from the vapor effluent by spraying the vapor effluent with cold oil which is generated and recirculated in the process.

These and various other objects and advantages of the present invention will become readily apparent to those skilled in the art upon reading the following detailed description and claims and by referring to the accompanying drawings.

The above objects are obtained in accordance with the present invention by the provision of an apparatus fabricated in a matter substantially as described in the above abstract and summary.

BRIEF DESCRIPTION OF THE DRAWINGS

For a detailed description of preferred embodiment of the invention, reference will now be made to the accompanying drawings, wherein:

FIG. 1 is a schematic drawing illustrating a preferred embodiment of the present invention;

FIG. 2 schematically shows an optional cyclone that may be included in the embodiment shown in FIG. 1 to remove solid particulate from the vapor stream ahead of the feed-vapor cross exchanger;

FIG. 3 schematically shows an optional scrubber that may be included in the embodiment shown in FIG. 1 to remove higher boiling range liquids from the vapor stream ahead of the feed-vapor cross exchanger;

FIGS. 4 and 5 show a perspective view of the internal drum scraper for preventing any sticking of waste material in the drum of the embodiment shown in FIG. 1;

FIGS. 6 and 7 show an enlarged view of the recirculation fan and the burner zone of the embodiment shown in FIG. 1;

FIG. 8 shows an optional way of handling the noncondensable stream in the embodiment shown in FIG. 1; and FIGS. 9, 10, and 11 show a perspective view of the internal drum baffles for controlling the flow of the solids in the embodiment shown in FIG. 1.

In the drawings, like items for the various figures have the same numbers and these items are numerically tabulated with a brief description for easy reference as follows:

| ITEM NO. | ITEM DESCRIPTION |
| --- | --- |
| 1 | Rotating Drum |
| 2 | Support Ring |
| 3 | Fins |
| 4 | Internal Baffles |
| 5 | Scrapers |
| 6 | Seal |
| 7 | Seal |
| 8 | Roller Wheels |
| 9 | Flame Zone |
| 10 | Slope Arrow |
| 11 | Heating Chamber |
| 12 | Seal |
| 13 | Seal |
| 14 | Recirculating Fam |
| 15 | Recirculation Fan Discharge Pipe |
| 16 | Burner |
| 17 | Fire Tube |
| 18 | Hot Gas Blend Tube |
| 19 | Vapor Pipe |
| 20 | Feed Pipe |
| 21 | Feed |
| 22 | Drum Vapor Effluent |
| 23 | Drum Solid Effluent |
| 24 | Water Phase |
| 25 | Oil Phase |
| 26 | Noncondensable Gas |
| 27 | Raw Feed Line |
| 28 | Centrifuge |
| 29 | Feed Pump |
| 30 | Exhaust Stack |
| 31 | Solids Collection Chamber |
| 32 | Feed Vapor Exchanger |
| 33 | Fins |
| 34 | Raw Feed/Vapor Exchanger |
| 35 | Fins |
| 36 | Solids Storage Tank |
| 37 | Solids Vapor Lock Valve |
| 38 | Optional Vapor Lock Valve |
| 39 | Optional Vapor Lock Valve |

-continued

| ITEM NO. | ITEM DESCRIPTION |
|---|---|
| 40 | Optional Vapor Lock Valve |
| 41 | Combustion Air Blower |
| 42 | Discharge Pipe |
| 43 | Combustion Air/Solids Heat Exchanger Chamber |
| 44 | Combustion Air Pipe |
| 45 | Solids Screw Conveyor |
| 46 | Conveyor Fins |
| 47 | Screw Conveyor Drive Shaft |
| 48 | Screw Conveyor Driver |
| 49 | Solids Collector |
| 50 | Bucket Elevator |
| 51 | Water Line |
| 52 | Noncondensable Gas Compressor |
| 53 | Oil Pump |
| 54 | Water Pump |
| 55 | Blended Hot Gas |
| 56 | Heat Transfer Hot Blend Gas |
| 57 | Cooled Gases |
| 58 | Recirculation Fan Discharge Gases |
| 59 | Exhaust Gases |
| 60 | Liquid Accumulator |
| 61 | Noncondensable Gas Equalizing Pipe |
| 62 | Feed Discharge Point |
| 63 | Vapor Cyclone |
| 64 | Ash |
| 65 | Cyclone Vapor Lock Valve |
| 66 | Sprocket |
| 67 | Condensables Transfer Pipe |
| 68 | Conveyor Screw |
| 69 | Fire Tube Cooling Zone |
| 70 | Recirculation Fan Blade |
| 71 | Chiller |
| 72 | Liquid Trap |
| 73 | Chilled Liquid Return Line |
| 74 | Filter |
| 75 | Cleaned Noncondensable Gas Line |
| 76 | Baffle Partition |
| 77 | Damper |
| 78 | Combustion Air |
| 79 | Heavy Oil |
| 80 | Scrubber |
| 81 | Mesh |
| 82 | Heavy Oil Pump |
| 83 | Air Cooler |
| 84 | Temperature Control Valve |
| 85 | Level Control Valve |
| 86 | Level Controller |
| 87 | Trays |
| 88 | Spray Head |
| 89 | Direction of Rotation |
| 90 | Scraper Support Member |
| 91 | Pivot Arm |
| 92 | Axis |
| 93 | Recirculation Blower Suction Pipe |
| 94 | Combustion Gas Blending Zone |
| 95 | Enclosure |

DESCRIPTION OF THE PREFERRED EMBODIMENTS

Referring now to FIG. 1, there is shown a mounted cylindrical rotating drum 1 with its lower end to the right of the viewer so that it slopes downward to the right as shown by slope arrow 10. Drum 1 is provided with support rings 2 on the top end and on the bottom end to support drum 1 for rotation. Roller wheels 8 with bearings, not shown, are provided to support rings 2 and to allow them to roll thereon. A sprocket 66 is attached to support ring 2 to rotate support ring 2 and drum 1. A conventional driving means, not shown, is attached to sprocket 66 for rotating drum 1. The upper support ring 2 of drum 1 is provided with seal 6 and the lower support ring 2 is provided with seal 7 to seal and to separate the atmosphere from the interior of drum 1. Drum 1 is also provided with fins 3, partly shown, for enhancing the heat transfer to the interior of drum 1 from a hot fluid medium flowing on the exterior surface of drum 1.

An enclosure 95 encloses drum 1 and forms a heating chamber 11 therebetween. Chamber 11 is provided with seals 12 and 13 against upper and lower support rings 2, respectively, to seal and to separate the atmosphere from chamber 11. Furthermore, the interior of drum 1 is isolated from chamber 11 and there is no fluid communication therebetween.

Burner 16 with fire tube 17 has a flame chamber for containing a flame and provides heat to the retort indirectly. Combustion air and fuel, not shown, are supplied to burner 16. According to the present invention, the heat is transmitted to drum 1 indirectly, without applying the flame of burner 16 to drum 1, by circulating hot gases around drum 1 in chamber 11 to heat drum 1, recirculating and reheating those gases in burner 16 and recirculating those reheated gases to chamber 11 for further heating drum 1. More particularly, after they supply heat to the drum I by flowing on the exterior surface thereof in chamber II, cooled gases 57 are drawn through recirculation blower suction pipe 93 from chamber 11 by recirculation fan 14 to recirculation fan discharge pipe 15 where recirculation fan discharge gases 58 are forced to encircle fire tube 17. Gases 58 cool fire tube 17 and continue on to blend with the products of combustion from burner 16 in hot gas blend tube 18 to form a hot gas 55 which is colder than the products of combustion and hotter than recirculation fan discharge gases 58. Hot gas 55 continues as heat transfer hot blend gas 56 which circulates longitudinally over the exterior surface of drum 1 and fins 3 in chamber 11 to provide the retorting heat to the interior of drum 1. As gas 56 progresses over the exterior surface of drum 1 and in chamber 11, it is gradually cooled. The cooled gas is drawn by fan 14 through pipe 93 as cooled gas 57 and the recirculation is repeated. The amount of recirculated cooled gas 57 is controlled by damper 77 in pipe 93. The preferred velocity of gas 56 in chamber 11 ranges from 50 to 200 feet per second. The products of combustion from burner 16 that are not recirculated as cooled gas 57 flow from the cold end of chamber 11 to the atmosphere as exhaust gases 59 through exhaust stack 30.

Reference is now made to FIG. 6 which shows an enlarged view of recirculation fan 14 with burner 16 and associated parts, and to FIG. 7 which shows an end view looking along section "A—A" of FIG. 6. In FIG. 6, burner 16 includes a flame tube 17 having a flame zone 9 for containing the flame therein. Fan blade 70 forces gases 58 through discharge pipe 15 and tangentially around fire tube 17 in fire tube cooling zone 69. Gases 58 provide cooling to tube 17 that is sufficient to prevent tube 17 from being damaged by the flame therein without impeding the complete combustion by the flame. After flowing through fire tube cooling zone 69, gases 58 blend with the products of combustion from flame zone 9 in combustion gas blending zone 94. The tangential flow of gases 58 is better shown in FIG. 7 where gases 58 flow around tube 17 in zone 69.

Referring now again to FIG. 1, the waste material fee 21 is pumped through pipe 20 and discharged into the interior of drum 1 at feed discharge point 62. As soon as the feed 21 touches the hot interior walls of drum 1, the liquid begins to vaporize into drum vapor effluent 22 and flows out of drum 1 through the first or upper end thereof, shown on the left side of the viewer. The drum solid effluent 23 flows by gravity provided by slope 10 towards the second or lower end of drum 1, shown on the right of the viewer, and exits the drum from that end.

Drum vapor effluent 22 flows through feed/vapor exchanger 32 where it exchanges heat with feed 21 in pipe 20. A portion of the vapor is condensed. Fins 33 are provided on pipe 20 to enhance the heat exchange between the two streams. Then, drum vapor effluent 22, including the condensed components, flows through raw feed/vapor exchanger 34 and pipe 27 where it is further cooled by raw feed in pipe 27 whereby, additional components of vapor effluent 22 are condensed. Fins 35 are provided in pipe 27 to enhance the heat exchange between the two streams. The vapor/liquid phase drum vapor effluent 22 then flows through condensables transfer pipe 67 to liquid accumulator 60 where the condensed material, such as oil and water, separate by gravity to form a lower water phase 24 and an upper oil phase 25. Water is pumped off from water phase 25 by water pump 54. The water removal is controlled by a level controller, not shown, located on accumulator 60. Similarly, the condensed oil from oil phase 25 is pumped off by oil pump 53 as controlled by an interface level controller, not shown, located on accumulator 60.

The noncondensable gas 26 from drum vapor effluent 22 collects in the cold end of heat exchanger 34 and in the top portion of accumulator 60. The pressure in accumulator 60 and heat exchanger 34 is equalized by noncondensable gas equalizing line 61. Noncondensable gas 26 is pumped by noncondensable gas compressor 52 from the top of accumulator 60 to burner 16 where it is mixed with combustion air and flows through the flame in flame tube 17. There, the methane and other fuel gas components in the noncondensable gas stream 26, including odor emitting components, are directly burned in the flame whose temperature exceeds 3000° F.

Drum solid effluent 23 flows downward to solids collection chamber 31 and then to a solids screw conveyor 45 having a conveyor screw 68, a screw conveyor drive shaft 47, and a screw conveyor driver 48. Screw conveyor 45 transfers solid effluent 23 to solids collector 49 and bucket elevator 50. Bucket elevator 50 transfers solids 23 to solids storage tank 36 having solids vapor lock valve 37.

Scrapers 5 are included at the upper end of drum 1 to prevent the feed to drum 1 from sticking to the wall thereof. Furthermore, internal baffles 4 are included in drum 1 to control the rapid downward flow of solids 23 in drum 1.

Referring now to FIGS. 4 and 5, there is shown an enlarged view of one arrangement for scrapers 5. In FIG. 4 there is shown drum 1 rotating in the direction indicated by direction of rotation 89. A scraper support member 90 that is inserted in the upper end of drum 1 supports scrapers 5. Support member 90 includes a pivot arm 91 and scrapers 5 pivot about an axis 92 by gravity as shown.

Referring now to FIGS. 9, 10 and 11, there are shown details of the arrangement of baffles 4 in drum 1. FIG. 9 shows an enlarged view of a section of drum 1 having baffle 4 with a baffle partition 76. Drum 1 is shown having a slope 10. FIG. 10 shows an end view of drum 1 with baffles 4 having partitions 76. Drum 4 is rotating in a counterclockwise direction as shown by direction of rotation 89. FIG. 11 shows an isometric view of a baffle 4 having a partition 76. The use of baffles 4 with partitions 76 is beneficial to the process in that they prolong the exposure of solids 23 to the heat. More particularly, dry solids 23 sometimes form balls and roll through drum 1 and out the bottom end rapidly whereby, they are not sufficiently heated. Baffles 4 lift the solids and tumble them to break up such balls. Partitions 76, placed on the lower end of baffle 4 as shown, control the downward speed of solids 23.

All the components of the apparatus shown in FIG. 1, except for centrifuge 28, bucket elevator 50 and storage tank 36 may be placed on one portable skid, if necessary.

For purposes of demonstrating the present invention an example will now be given to show the operation of the apparatus shown in FIG. 1 wherein the waste material to be treated is a domestic sewage sludge. Domestic sewage sludge is most commonly generated in the course of treating sewage by the activated sludge wastewater treatment process. The raw sewage sludge which is about 98 percent water and two (2) percent solids requires disposal. The preferred method of disposal is to utilize the sewage sludge as fertilizer. That method of disposal, however, presents a problem because the sludge has a noxious odor and it contains a high amount of water, pathogenic organisms, and, in some instances, metals. Various methods and devices such as drying beds, centrifuges and belt presses have been employed to reduce the water content of the sewage sludge prior to disposal. One disadvantage of these methods is that, although they are typically capable of removing ninety (90) percent of the water in a substantially solids free form, they do not solve any of the aforementioned problems of disposal arising out of the presence of odors, pathogenic organisms or metals. Another disadvantage is that the remaining sludge still contains an appreciable amount of water in the order of approximately eighty (80) percent with the remaining twenty (20) percent being solids.

Small sewage treatment plants and municipalities are usually able to dispose of this twenty (20) percent solids stream by landfill or land treating methods, with or without additional treatment, such as lime stabilization. Large treatment plants and municipalities are presently further treating the twenty (20) percent solids stream to remove the remaining water, to sterilize the pathogenic organisms and to deodorize the remaining stream. Factors dictating the need for such treatment include volume reduction requirements, economics, political and community considerations, limited landfill and land treatment capacity, and the ability to sell the resulting dry solids as a commercial fertilizer. Present day methods and devices of treating the twenty (20) percent solids stream to dry solids, such as flash driers are very costly and expensive to operate.

Referring now again to the apparatus of FIG. 1, the raw sewage sludge containing 98 percent water and two (2) percent solids is pumped through raw feed line 27 first, to exchanger 34 where it is preheated and, then, to centrifuge 28 where a substantial portion of the water is removed. The preheating of the sludge in exchanger 34 enhances the performance of centrifuge 28. About ninety (90) percent of the water, substantially free of solids, is removed by centrifuge 28 and flows through water line 51 to further water treatment. The remaining concentrated raw sewage sludge feed 21 which is about ten (10) percent of the initial raw sewage sludge, contains substantially all of the solids and it consists of about twenty (20) percent solids and eighty (80) percent water. Raw sewage sludge or feed 21 is pumped by feed pump 29 through pipe 20 to heat exchanger 32 and is then discharged in rotating drum 1 at point 62. As soon as feed 21 hits the hot walls of rotating drum 1, the liquid begins to vaporize to form drum vapor effluent 22 and dried drum solid effluent 23. Drum vapor effluent 22 flows out of the top of drum 1 and the solids 23 flow by gravity down to the right and out of the bottom of drum 1. Scrapers 5 are provided at the upper end of drum 1 to prevent the wet feed 21 from sticking to the wall of drum 1 before the feed dries. Because the dried solids 23 tend to rush down to the right, baffles 4 are provided to control the downward flow thereof.

Drum vapor effluent 22 flows through vapor pipe 19 to heat exchangers 32 and 34. In heat exchanger 32, the feed 21 is preheated to over 200° F. A very small amount of the water in drum vapor effluent 22, however, is condensed therein. In heat exchanger 34, substantially all of the condensables present in drum vapor effluent 22 are condensed supplying sufficient heat to raise the temperature of the raw feed in pipe 27 by about 15° to 20° F.

The condensables from drum vapor effluent 22 which are collected in accumulator 60 are mostly water 24 and a very small amount of oil 25. A level control, not shown, on accumulator 60 controls pump 54 to maintain a constant level in accumulator 60 by pumping off excess water for further water treatment and disposal. An interface level control, not shown, located on accumulator 60 controls pump 53 for pumping the excess oil from oil phase 25.

The noncondensable gases 26 which may contain methane, hydrogen sulfide, other noncondensable fuel and nonfuel gases, such as air that had been dissolved in the feed, are pumped by compressor 52 from the top of accumulator 60 and from the bottom of heat exchanger 34, through equalizer line 61, to burner 16. Gases 26 and combustion air are injected in burner 16 where they are burned by a flame whose temperature exceeds 3000° F. The injection of noncondensables 26 provides not only additional fuel but, also, facilitates the disposal of odorous gases.

Fuel and combustion air are supplied to burner 16 and the amount supplied is regulated by a temperature controller, not shown, that selectively controls the desired temperature of the hot blend gas 55, the cold gas 57, or the dry solids 23 in chamber 31. Damper 77 is provided in suction pipe 93 to help control the amount of recirculation gases 57 recirculated by recirculation fan 14 and, consequently, to control the temperature difference between gases 55 and 57. Furthermore, the temperature of dry solids 23 is controlled by controlling the temperature of blend gas 55.

Usually, the temperature of the dry solids should be between 225° and 400° F. At a temperature of about 300° F., substantially all of the water is removed, the live organisms are destroyed, and the dry solids are deodorized and sterilized. If the residual metal content is not prohibitive, the dry solids can then be safely used as fertilizer. Since the dry solids usually have a heat content greater than 5000 Btu per pound, they can also be used as a fuel.

The hot dry solids 23 exiting drum 11 are conveyed by screw conveyor 45 to solids collector 49. Screw conveyor 45 is provided with conveyor fins 46 and is enclosed by combustion air/solids heat exchanger enclosure 43 forming a chamber therebetween. Combustion air from combustion air blower 41 and discharge pipe 42 flows in the chamber and around the screw conveyor material whereby the air is heated and the dry solid product 23 is cooled. Hot combustion air 78 flows to the burner 16 from heat exchanger 43 through combustion air pipe 44.

The cooled dry product is collected in solids collector 49, lifted by bucket elevator 50, and transferred to storage tank 36. The product can then be removed from tank 36 through vapor lock valve 37 which allows solids to flow down and out but prevents air from going in. Optionally, vapor lock valves can be placed at points 38, 39, and 40.

Although the above example demonstrates the use and operation of the present invention for the processing of a sewage sludge, it should be understood that the present invention can be used in the processing of other waste or non-waste material. Regardless what the considerations and objectives are, the material is easier handled when separated in accordance with the present invention into different phases of gas, light liquid, heavy liquid, liquids having higher boiling points, and solids.

In the case, for example, of a material that is classified as a hazardous material because it is flammable and the flammability is attributed to the presence of flammable oil, that hazardous material can be processed in a manner similar to that described above to separate the solids and the water from the oil. The solids and the water are disposed of by conventional methods and the oil is treated as hazardous by itself. The same procedure could be used if only the solid was considered hazardous.

In practicing the invention, the embodiment shown in FIG. 1 may be modified and certain parts thereof may be deleted or substituted for by others and other parts may be added without departing from the spirit of the invention. Some of the modifications are discussed hereinafter.

In one modification, the vapor effluent may be withdrawn from the second end of the drum, i.e., the end from which the solid effluent is withdrawn. In that event, the temperature of the vapor effluent is higher than it would have been, had it been withdrawn from the first, i.e., the front end of the drum.

Another modification to the embodiment of FIG. 1 relates to rotating drum 1. More particularly, rotating drum 1 may be replaced with a screw conveyor and appropriate auxiliary feed and discharge equipment suitable for passing waste material over the heated medium provided by hot gas 56 to vaporize the liquids and to produce dry solids. The screw conveyor should be sealed to prevent the material processed therein from contacting the hot circulating gas 56 or the atmosphere.

Another modification may be made when treating some materials that may not contain a large amount of cold water in the raw feed whereby the feed cannot supply sufficient cooling to condense the condensables in the drum vapor effluent 22. In that case, line 27 may be supplied with an alternate cold water supply. Alternatively, heat exchanger 34 may be replaced with an air cooler.

It has been found that, in most operations and more particularly in operations treating sewage sludge, pump 29 can be a positive displacement pump or a progressive cavity pump. Some waste materials, however, contain a large amount of solids and therefore, cannot be pumped. In that case, pump 29 shown in FIG. 1 would be replaced with an air lock valve having a hopper mounted above it and pipe 20 would be replaced with a screw conveyor. The screw conveyor would be sealed and would have fins running longitudinally for cross exchanging heat between vapors 22 and feed 21.

Still for another modification, reference is now made to FIG. 8 which shows an optional method of handling noncondensable gas 26 from accumulator 60. If noncondensable gas 26 contains hazardous materials that cannot be burned in the burner, it may be desirable to remove such hazardous waste gases and return them to the oil stream. This is done by providing a chiller 71, after compressor 52, to chill the noncondensable gas 26 and to further condense the hazardous waste gases. Liquid trap 72 collects the condensed hazardous waste liquid and returns it to the oil via chilled liquid return line 73. The remaining noncondensable gas then flows through filter 74 which contains charcoal or suitable material for removing any residual hazardous waste components. The noncondensable gas which is now free from hazardous waste component flows through clean noncondensable gas line 75 to burner 16.

In processing some materials, a fine ash or cinders is formed in the retort zone of drum 1 and is carried out by drum vapor effluent 22. FIG. 2 shows a method of removing such material by adding a vapor cyclone 63 having a cyclone vapor lock valve 65. Cyclone 63 should be added in line 19, before effluent 22 flows to vapor/feed heat exchanger 32.

Another method and apparatus for removing ash from vapor stream 22 is shown in FIG. 3. A scrubber 80 is added in pipe 19 between heat exchanger 32 and drum 1 in the embodiment shown in FIG. 1. Scrubber 80 has a sprayer head 88, a mesh 81, and trays 87. A heavy oil pump 82, an air cooler 83, a liquid level control valve 85, and a level controller 86 are also included. In operation, pump 82 circulates heavy oil 79 from the bottom of scrubber 80 through air cooler 83, a temperature control valve 84, sprayer head 88, and onto mesh 81. Oil 79 has a boiling point that is higher than the boiling point of oil 25 previously discussed in connection with accumulator 60. When drum vapor effluent stream 22 comes in contact with the recirculated cold oil 79 on mesh 81, high boiling point components of stream 22 condense, flow over trays 87, and accumulate in the bottom of scrubber 80 as heavy oil 79 for further recirculation. Excess heavy oil 79 is pumped off through control valve 85 which is controlled by level controller 86. The uncondensed portion of stream 22 which contains light oil and water vapors exits scrubber 80 at the top for further downstream condensation and recovery. The use of scrubber 80 accomplishes two main objectives. First, scrubber 80 removes solids from stream 22 by wetting them with cold oil sprayed by sprayer head 88 onto mesh 81. Second, scrubber 80 removes the higher boiling point, i.e., higher flash point, oil 79 from stream 22. In most cases, oil 79 meets a specification for fuel oil and can be sold directly to fuel oil users.

It should be understood that although streams 25 and 79 have been referred to heretofore as oil, in some instances the waste may not contain oils but other material that are immiscible with water, have a boiling point different than water or have a different specific gravity than water. In those instances, accumulator 60, referred to in FIG. 1, and/or scrubber 80, referred to in FIG. 3, may be used to collect those material, separate them from water, and dispose of them accordingly.

Although the invention is described with respect to specific embodiments and modifications, other modifications thereof can be made by one skilled in the art without departing from the spirit of the invention and the details hereof are not to be construed as limitations, except to the extent indicated in the following claims.

What is claimed is:

1. A retort for treating waste, comprising:
a sloped rotating drum having a front end and a back end, the front end being in a higher position with respect to the back end;
rotating means being mounted to the drum for rotating the drum;
fins being affixed to the exterior surface of the drum;
scrapers being mounted in the drum for scraping material from the surface of the drum;
baffles mounted in the interior surface of the drum;
a drum enclosure for enclosing the drum and forming a chamber therebetween, the chamber being isolated from the interior of the drum;
a burner being mounted apart from the drum and having a fire tube, the burner generating hot exhaust gases;
a first conduit for conveying the hot exhaust gases to the chamber where the exhaust gases release heat to the drum whereby the exhaust gases are cooled;
a second conduit for returning cooled exhaust gases from the chamber to the burner, flowing the returned cooled exhaust gases over the fire tube to cool the fire tube, and mixing the returned cooled exhaust gases with hot exhaust gases generated by the burner;
a fan being mounted in the second conduit for providing the driving force for conveying the exhaust gases from the burner to the chamber and for returning the cooled exhaust gases to the burner;
a damper being mounted in the second conduit for regulating the amount of cooled exhaust gases being returned to the burner from the chamber;
an exhaust line for exhausting exhaust gases to the atmosphere;
a seal for sealing the chamber from the atmosphere whereby fluid communication between the chamber and the atmosphere is provided through the exhaust line only;
a screw conveyor being connected to the back end of the drum by a collection chamber, the screw conveyor having an inlet and an outlet;
a conveyor enclosure enclosing a portion of the conveyor and forming a flow passage therebetween, the flow passage having an inlet and an outlet;
an air compressor being connected to the inlet of the flow passage;
an air conduit for connecting the outlet of the flow passage to the air inlet of the burner;
a collector being connected to the outlet of the screw conveyor;
a bucket elevator being connected to the collector and having a bucket elevator discharge;
a storage tank being connected to the bucket elevator discharge;
a vapor conduit being in fluid communication with the front end of the drum;
an accumulator being connected to the outlet of the vapor conduit;
an overhead line connecting the overhead of the accumulator with the fuel burning side of the burner;
a compressor for providing a driving force for vapors slowing in the overhead line;

a first liquid line for removing liquid from one section of the accumulator;
a second liquid line for removing liquid from another section of the accumulator;
a first pump being connected to the first liquid line;
a second pump being connected to the second liquid line;
a pressure equalizing line connecting the second exchanger and the accumulator;
a feed conduit being connected to the front end of the drum;
a first heat exchanger for providing heat exchange between the feed conduit and the vapor conduit;
a second heat exchanger for providing heat exchange between the feed conduit and the vapor conduit;
a centrifuge being connected to the feed conduit; and
a feed pump being connected to the feed conduit.

2. A retort, comprising:
a drum;
means for preventing communication between the interior of the drum and the atmosphere;
a burner having a fire tube and generating hot exhaust gases;
means for flowing a hot fluid medium from the burner to he exterior surface of the drum to supply heat to the drum whereby the hot fluid medium is cooled;
means for returning cooled fluid medium from the exterior surface of the drum to the burner;
means for encircling the fire tube with the returned cooled fluid medium to cool the fire tube;
means for blending the returned cooled fluid medium with hot exhaust gases from the burner following the encircling of the fire tube by the returned cooled fluid medium to generate the hot fluid medium which flows to the exterior surface of the drum via the flowing means; and
means for preventing communication between the fluid medium and the interior of the drum.

3. A retort according to claim 2 wherein the drum is a rotating drum.

4. A retort according to claim 2 wherein the fluid medium is gas.

5. A retort according to claim 2 wherein the fluid medium is exhaust gas being generated by the burner.

6. A retort according to claim 5 further including means for releasing exhaust gas to the atmosphere.

7. A retort according to claim 4 wherein the returning means includes a fan.

8. A retort according to claim 2 wherein the returning means includes means for regulating the amount of returned fluid medium in the returning means.

9. A retort according to claim 2 further including means for feeding waste material to the interior of the drum.

10. A retort according to claim 9 further including means for removing a vapor material generated from the waste material from the interior of the drum.

11. A retort according to claim 9 further including means for removing a solid material generated from the waste material from the interior of the drum.

12. A retort according to claim 9 further including means for preheating the feed material.

13. A retort according to claim 9 further including means for concentrating the feed material prior to feeding the material to the drum.

14. A retort according to claim 10 further including means for condensing a portion of the vapor material to form a condensed portion and a noncondensed portion.

15. A retort according to claim 14 further including means for separating the condensed portion to fractions that are not soluble with respect to each other.

16. A retort according to claim 14 further including means for separating the condensed portion to an oil and a water phase.

17. A retort according to claim 10 further including a heat exchanger for exchanging heat between the vapor material and the waste material.

18. A retort according to claim 10 further including a heat exchanger for exchanging heat between the vapor material and the waste material.

19. A retort according to claim 11 further including means for cooling the solid material by air after it is removed from the drum.

20. A retort according to claim 11 further including means for storing the solid material.

21. A retort according to claim 14 further including means for utilizing the noncondensed portion as fuel for the heat supply means.

22. A retort according to claim 9 further including means for scraping waste material from the interior walls of the drum.

23. A retort for treating waste material, comprising:
a drum;
a drum enclosure for enclosing the drum and forming a chamber therebetween, the chamber being isolated from the interior of the drum to prevent fluid communication between the chamber and the interior of the drum;
a burner having a fire tube and generating hot exhaust gases;
a recirculation loop conduit for conveying the hot exhaust gases to the chamber where the hot exhaust gases release heat to the drum whereby the hot exhaust gases are cooled to form cooled exhaust gases, returning cooled exhaust gases from the chamber to the burner, flowing the cooled exhaust gases over the exterior surface of the fire tube, mixing the returned cooled exhaust gases with hot exhaust gases generated by the burner, and circulating the mixture to the chamber;
means for feeding waste material to the drum;
means for removing vapor effluent from the drum; and
means for removing solid effluent from the drum.

24. A retort according to claim 23 further including heat transfer means for enhancing the heat transfer between the chamber and the interior of the drum.

25. A retort according to claim 24 wherein the heat transfer means includes fins mounted on the exterior surface of the drum.

26. A retort according to claim 23 wherein the drum is a rotating drum.

27. A retort according to claim 26 further including means for rotating the drum.

28. A retort according to claim 23 wherein the drum is a sloped drum having a first end at an elevated position with respect to a second end of the drum.

29. A retort according to claim 23 further including scrapping means mounted in the drum for scrapping material from the interior surface of the drum.

30. A retort according to claim 28 further including baffles mounted on the interior of the drum.

31. A retort according to claim 23 wherein the recirculation loop includes:
   a hot gas conduit being connected to the burner on one end and to the chamber on the other end for flowing hot exhaust gases from the burner to the chamber;
   a cold gas conduit being connected to the chamber on one end and to the burner on the other end for flowing cooled exhaust gases from the chamber to the burner, the cold gas conduit enclosing the fire tube so as to flow cooled exhaust gases over the fire tube to cool the fire tube; and
   a fan mounted in the cold gas conduit for providing a driving force for the exhaust gases in the recirculation loop.

32. A retort according to claim 23 further including means for exhausting exhaust gases from the chamber to the atmosphere.

33. A retort according to claim 23 further including means for preheating the waste material.

34. A retort according to claim 23 further including means for concentrating the waste material.

35. A retort according to claim 23 further including:
   heat exchanger means for condensing a portion of the vapor effluent;
   an accumulator being connected to the heat exchanger means, the accumulator receiving the vapors and condensed liquids from the heat exchanger means;
   an overhead line for removing vapors from the accumulator; and
   a liquid line for removing liquids from the accumulator.

36. A retort according to claim 35 further including a chiller being connected to the overhead line for condensing vapor in the overhead line.

37. A retort according to claim 35 further including a filter in the overhead line.

38. A retort according to claim 23 further including:
   a screw conveyor being connected to the means for removing solids from the drum;
   a bucket elevator having communication with the screw conveyor and receiving material from the screw conveyor; and
   a storage tank for receiving material from the bucket elevator.

39. A retort according to claim 38 further including:
   means for flowing air over the exterior of the screw conveyor to cool the material being handled by the screw conveyor; and
   means for directing the air to the burner.

40. A retort according to claim 23 further including means for separating solid particulates from the vapor effluent.

41. A retort according to claim 40 wherein the means for separating solids includes a cyclone being connected to the means for removing vapor effluent.

42. A retort according to claim 40 wherein the means for separating solids includes:
   a scrubber;
   a drum/scrubber conduit for directing vapor effluent from the drum to the scrubber;
   a scrubbing liquid circulating means for circulating a scrubbing liquid from the bottom portion of the scrubber to the top portion of the scrubber;
   a scrubbing liquid cooling means for cooling the circulating scrubbing liquid; and
   a scrubbing liquid spraying means for spraying the circulating scrubbing liquid in the scrubber.

* * * * *